United States Patent
Okoshi

(10) Patent No.: US 11,440,614 B2
(45) Date of Patent: Sep. 13, 2022

(54) MOTORCYCLE

(71) Applicant: HONDA MOTOR CO., LTD., Tokyo (JP)

(72) Inventor: Satoru Okoshi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 378 days.

(21) Appl. No.: 16/816,305

(22) Filed: Mar. 12, 2020

(65) Prior Publication Data

US 2020/0298931 A1 Sep. 24, 2020

(30) Foreign Application Priority Data

Mar. 19, 2019 (JP) .............................. JP2019-051383

(51) Int. Cl.
*B62L 3/00* (2006.01)
*B62L 1/02* (2006.01)
*B62K 11/00* (2006.01)

(52) U.S. Cl.
CPC ............... *B62L 3/00* (2013.01); *B62K 11/00* (2013.01); *B62L 1/02* (2013.01)

(58) Field of Classification Search
CPC ............... B62L 1/02; B62L 3/00; B62K 11/00
See application file for complete search history.

(56) References Cited

U.S. PATENT DOCUMENTS 8,651,213 B2    2/2014    Nagakubo et al.
9,132,813 B2    9/2015    Matsuda

FOREIGN PATENT DOCUMENTS

| CA | 2707303 | * 11/2009 | ............ B60W 30/18 |
| JP | 2012-144240 | 8/2012 | |
| JP | 5695496 | 4/2015 | |
| JP | 3067584 | * 9/2016 | ............ B62K 11/00 |
| JP | 3073144 | * 9/2016 | ............ B62K 11/00 |
| WO | 2006/053864 | 5/2006 | |

OTHER PUBLICATIONS

Indian Office Action for Indian Patent Application No. 202014011459 dated Jan. 25, 2022.

* cited by examiner

*Primary Examiner* — Tony H Winner
(74) *Attorney, Agent, or Firm* — Amin, Turocy & Watson, LLP

(57) ABSTRACT

A motorcycle includes: a front wheel brake that brakes a front wheel that is supported by a front fork; a rear wheel brake; a control unit that controls an ABS modulator connected to the front wheel brake and the rear wheel brake on the basis of front wheel speed and rear wheel speed; and a front wheel rise detection unit that detects whether the front wheel is likely to rise from a road surface, wherein when the front wheel rise detection unit detects that the front wheel is likely to rise, the control unit operates the front wheel brake through the ABS modulator.

5 Claims, 9 Drawing Sheets

MOTORCYCLE

CROSS-REFERENCE TO RELATED APPLICATION

This application is based upon and claims the benefit of priority from Japanese Patent Application No. 2019-051383 filed on Mar. 19, 2019, the contents of which are incorporated herein by reference.

BACKGROUND OF THE INVENTION

Field of the Invention

The present invention relates to a motorcycle that prevents an occurrence of a wheelie (front wheel lifted) travel state.

Description of the Related Art

For example, Japanese Laid-Open Patent Publication No. 2012-144240 (hereinafter, referred to as JP 2012-144240 A) discloses a technique regarding a two-wheeled vehicle control device that performs brake control of a motorcycle. In this technique, a slip ratio is calculated on the basis of the front wheel speed and the rear wheel speed. If the calculated slip ratio is more than a predetermined threshold, a front wheel brake and a rear wheel brake are operated through an ABS modulator so that a lock of wheels is prevented (in the paragraph [0018] of JP 2012-144240 A).

Moreover, J P 2012-144240 A discloses the following technique. If a wheelie travel state in which a front wheel rises has occurred, engine output is decreased to suppress the wheelie travel or a TCS (Traction Control System) control is performed to brake a rear wheel (in the paragraph of JP 2012-144240 A).

SUMMARY OF THE INVENTION

By the technique disclosed in JP 2012-144240 A, if the wheelie travel state has occurred, it is expected that the front wheel will land on a road surface.

However, in a structure described in JP 2012-144240 A, the control is performed on the premise that the wheelie can occur. Thus, in consideration of a driving characteristic that is peculiar to the motorcycle, such as steering performance or braking performance, it is desired that the control is performed to prevent the wheelie travel.

The present invention has been made to solve the above problem, and an object thereof is to provide a motorcycle that can prevent an occurrence of a wheelie travel state with a simple structure.

A motorcycle according to one aspect of the present invention includes: a front wheel brake configured to brake a front wheel (FW) that is supported by a front fork including a suspension; a rear wheel brake configured to brake a rear wheel (RW) supported by a swing arm; an ABS modulator connected to the front wheel brake and the rear wheel brake; a control unit configured to control the ABS modulator on a basis of front wheel speed and rear wheel speed; and a front wheel rise detection unit configured to detect whether the front wheel (FW) is likely to rise from a road surface, wherein when the front wheel rise detection unit detects that the front wheel (FW) is likely to rise, the control unit operates the front wheel brake through the ABS modulator.

In the present invention, if it has been detected that the front wheel of the motorcycle is likely to rise from the road surface (wheelie travel is likely to occur), the front wheel brake is operated through the ABS modulator. Thus, the suspension operates in a direction in which the front fork sags. Therefore, it is possible to prevent the wheelie travel state of the motorcycle from occurring with a simple structure.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

An embodiment of a motorcycle according to the present invention is hereinafter described in detail with reference to the attached drawings.

Embodiment

[Structure]

Figure 1:
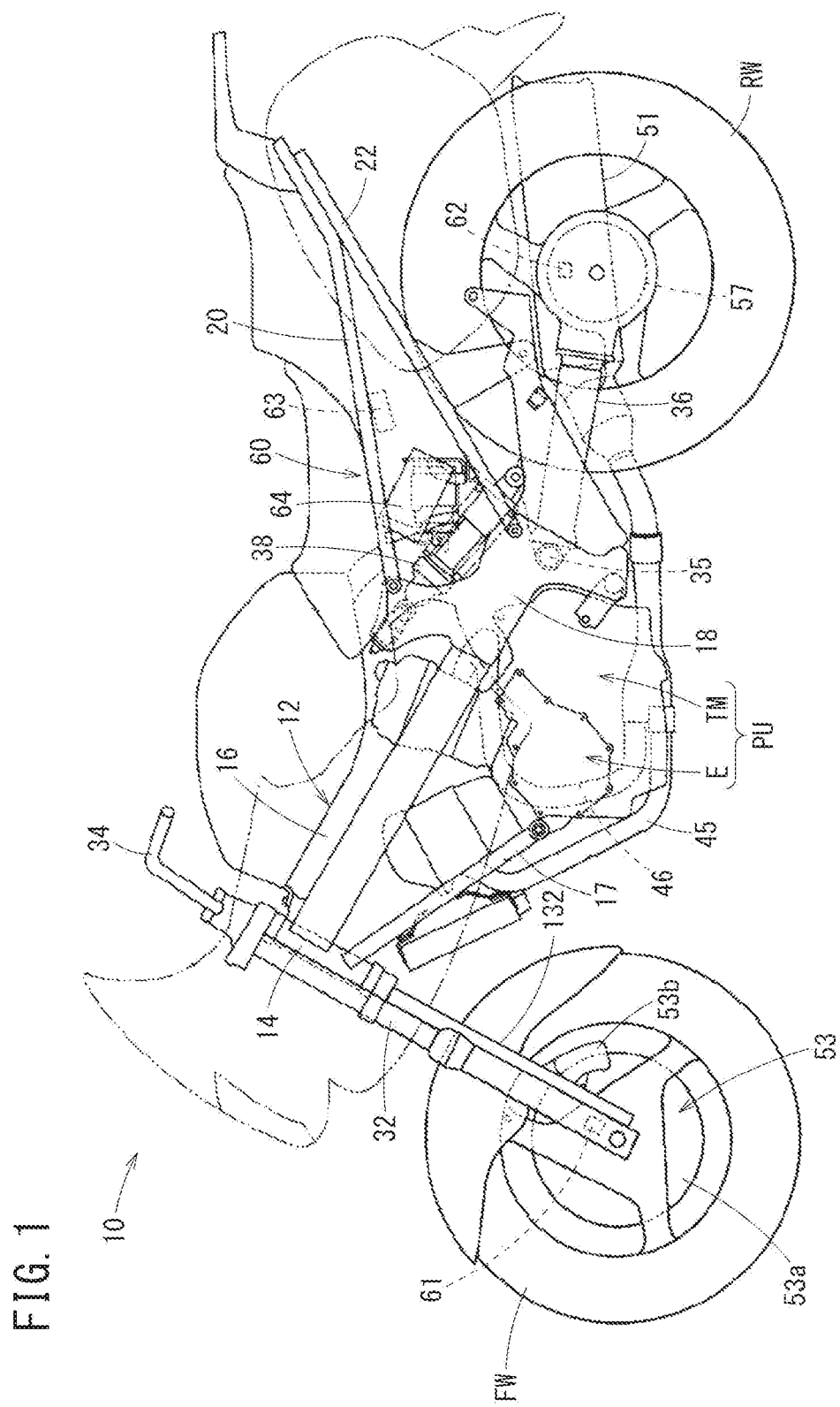
FIG. 1 is a side view of a motorcycle according to an embodiment.
Figure 2:
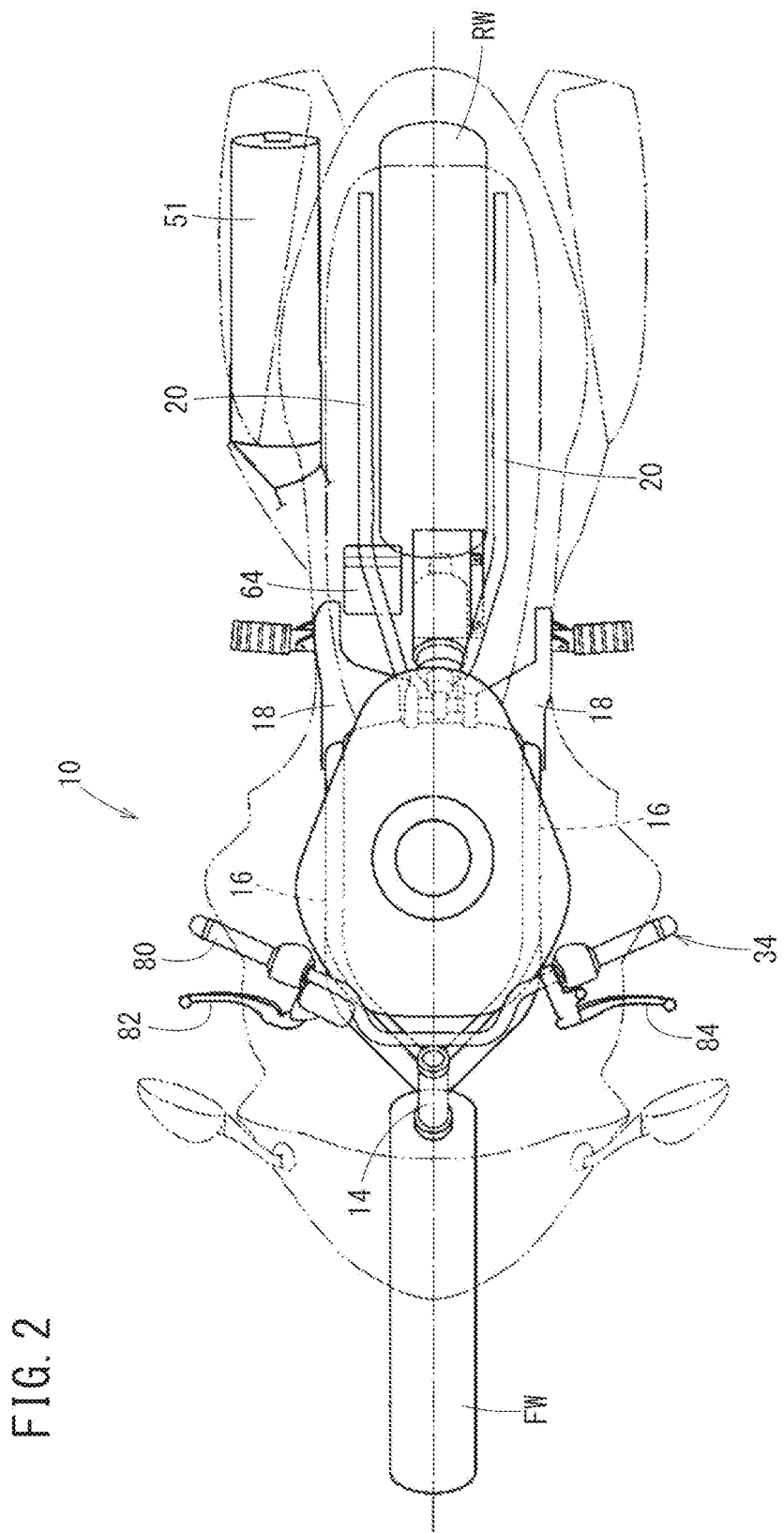
FIG. 2 is a plan view of the motorcycle illustrated in FIG. 1.

FIG. 1 is a side view of a motorcycle (hereinafter, also referred to as two-wheeled vehicle or vehicle) 10 according to the embodiment. FIG. 2 is a plan view of the two-wheeled vehicle 10.

As illustrated in FIG. 1 and FIG. 2, the two-wheeled vehicle 10 includes a vehicle body frame 12. The vehicle body frame 12 includes a head pipe 14, a pair of left and right main frames 16 that obliquely extends rearward and downward from the head pipe 14, a pair of left and right pivot plates 18 that is attached to rear ends of the main frames 16, a pair of left and right down frames 17 that obliquely extends rearward and downward from the head pipe 14 below the main frames 16, a pair of left and right seat rails 20 that extends rearward from upper parts of the pivot plates 18, and a sub frame 22 that bridges between a rear part of the seat rail 20 and a rear part of the pivot plate 18.

The two-wheeled vehicle 10 includes a power unit PU including a transmission TM and an engine E supported between the pivot plate 18 and the down frame 17.

A front fork 32 is attached to the head pipe 14 in a steerable manner. The front fork 32 supports a front wheel FW by a spring and a damper (neither are shown). A bar handle 34 is attached to an upper end of the front fork 32.

A swing arm 36 that supports a rear wheel RW is attached to the pivot plate 18 through a pivot shaft 35.

The swing arm 36 houses a shaft that transmits motive power from the transmission TM to the rear wheel RW in a hollow part. A rear cushion unit 38 is provided between the swing arm 36 and the pivot plate 18.

Exhaust pipes 45, 46 extend downward from a front side cylinder and a rear side cylinder of the engine E so as to connect to a muffler 51.

Note that in the example of the present embodiment, a shaft drive is described as a structure of a motive power transmission mechanism. However, the motive power may be transmitted by a chain from the transmission TM to the rear wheel RW.

Figure 3:
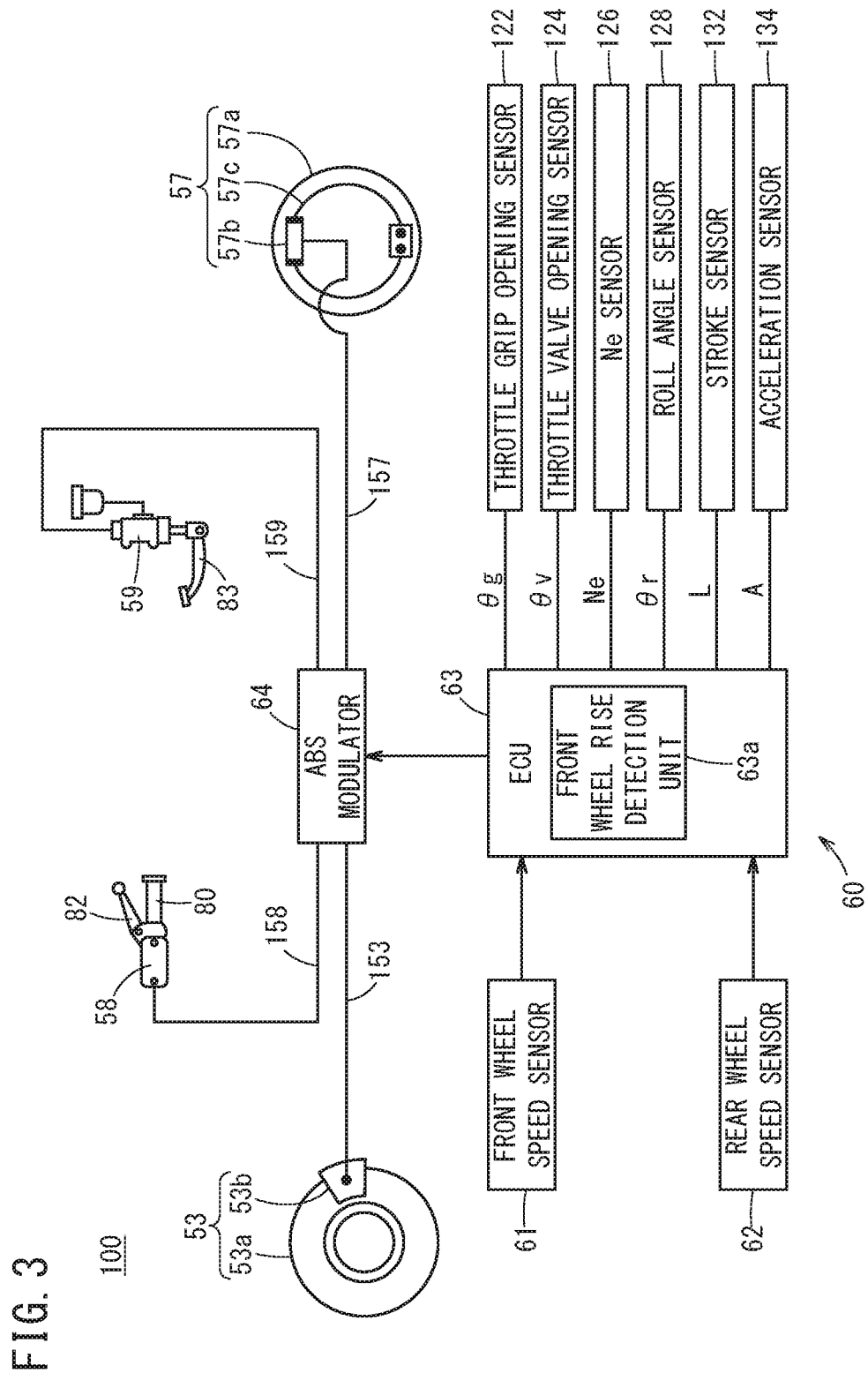
FIG. 3 is a block diagram illustrating a structure of a brake system of a vehicle.

FIG. 3 illustrates a structure of a brake system 100 provided to the vehicle 10.

The brake system 100 includes a front disc brake device (front brake device or front wheel brake) 53 that brakes the front wheel FW, a rear drum brake device (rear brake device or rear wheel brake) 57 that brakes the rear wheel RW, and an ABS modulator 64.

The front wheel brake 53 includes a brake disc 53a (also see FIG. 1) that is integrally attached to the front wheel FW and a brake caliper 53b that is attached to the front fork 32. The brake caliper 53b holds the brake disc 53a, so that the front wheel FW is braked.

The rear wheel brake 57 includes a brake drum 57a that is integrally attached to the rear wheel RW, and a wheel cylinder 57b and a brake shoe 57c provided to the inside of the brake drum 57a. The wheel cylinder 57b pushes the brake shoe 57c to the brake drum 57a, so that the rear wheel RW is braked (also see FIG. 1).

The front wheel brake 53 and the rear wheel brake 57 are connected to the anti-lock brake system modulator (ABS modulator) 64 that forms an anti-lock brake system (ABS) 60.

As it is commonly known, the ABS modulator 64 includes an electric motor, a pump that is driven by the electric motor, a plurality of fluid pressure pipes (fluid paths) connected to the pump, a solenoid valve that is provided in the middle of the fluid pressure pipes (fluid paths), and the like. As illustrated in FIG. 1, the ABS modulator 64 is an assembly that is disposed between the seat rail 20 and the sub frame 22 in the side view.

On a right grip side of the bar handle 34 (FIG. 1), a throttle grip 80, a front wheel brake lever 82, and a front master cylinder 58 illustrated in FIG. 3 are provided. The front master cylinder 58 supplies fluid pressure (hydraulic pressure) to the brake caliper 53b through a fluid path 158, the ABS modulator 64, and a fluid path 153.

A rear wheel brake pedal 83 and a rear master cylinder 59 illustrated in FIG. 3 are provided near a main step of a lower part of a vehicle body. The rear master cylinder 59 supplies the fluid pressure (hydraulic pressure) to the wheel cylinder 57b through a fluid path 159, the ABS modulator 64, and a fluid path 157.

The ABS 60 includes a front wheel speed sensor 61 that detects the wheel speed of the front wheel FW, a rear wheel speed sensor 62 that detects the wheel speed of the rear wheel RW, and an ECU (electronic control unit) 63 as a control unit (control device) that transmits a control signal to the ABS modulator (fluid pressure unit) 64 so as to determine a slip state of the wheels in the braking on the basis of wheel speed signals from the front wheel speed sensor 61 and the rear wheel speed sensor 62 and keep an appropriate slip ratio.

The ECU 63 executes programs that are stored in an internal storage device so as to operate as various function achievement units. In the present embodiment, the ECU 63 functions as a front wheel rise detection unit (front wheel rise possibility detection unit or wheelie state occurrence possibility detection unit) 63a or the like.

The ABS modulator 64 increases or decreases the fluid pressure (hydraulic pressure) for braking the front wheel FW by the brake caliper 53b of the front disc brake device 53 from the front master cylinder 58 through the fluid path 158 and the fluid path 153 on the basis of the control signal from the ECU 63. On the other hand, the ABS modulator 64 increases or decreases the fluid pressure (hydraulic pressure) for braking the rear wheel RW by the wheel cylinder 57b and the brake shoe 57c of the rear drum brake device 57 from the rear master cylinder 59 through the fluid path 159 and the fluid path 157.

To the ECU 63 of the brake system 100, a throttle grip opening sensor 122 that detects opening θg of the throttle grip 80 (grip opening θg), a throttle valve opening sensor 124 that detects opening θv of a throttle valve, a rotation speed sensor (Ne sensor) 126 that detects an engine rotation speed (rotation speed of crank shaft) Ne of the engine E, a roll angle sensor (bank angle detection unit) 128 that detects a roll angle (bank angle) θr corresponding to a bank angle of the motorcycle 10, a stroke sensor 132 that detects a stroke amount L of the front fork 32, and an acceleration sensor 134 that detects front-rear acceleration A are further connected.

[Operation]

An occurrence prevention control process for a wheelie travel state of the motorcycle 10 according to the present embodiment basically structured as above is described with reference to flowcharts in FIG. 4 to FIG. 7. Note that the ECU 63 mainly executes the programs according to the flowcharts; however, referring to this description in each process is complicate, and thus the description is appropriately omitted.

Figure 4:
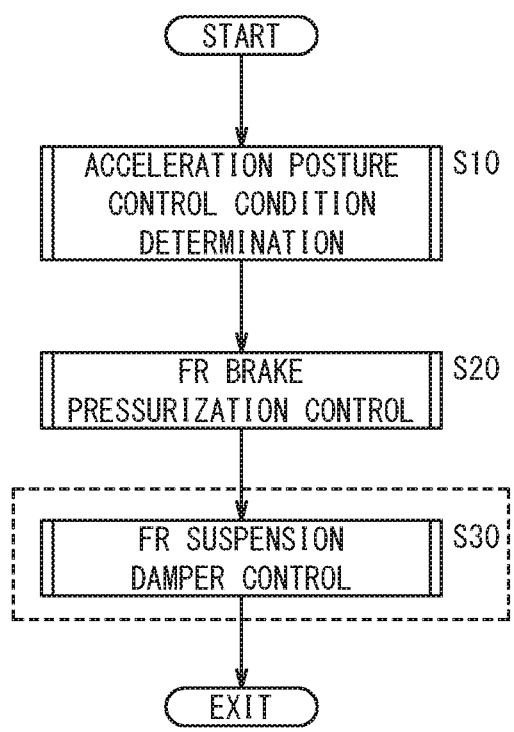
FIG. 4 is an overall flowchart for describing operation of an occurrence prevention control process for a wheelie travel state.

FIG. 4 is an overall flowchart for describing operation of the occurrence prevention control process for the wheelie travel state.

Figure 5:
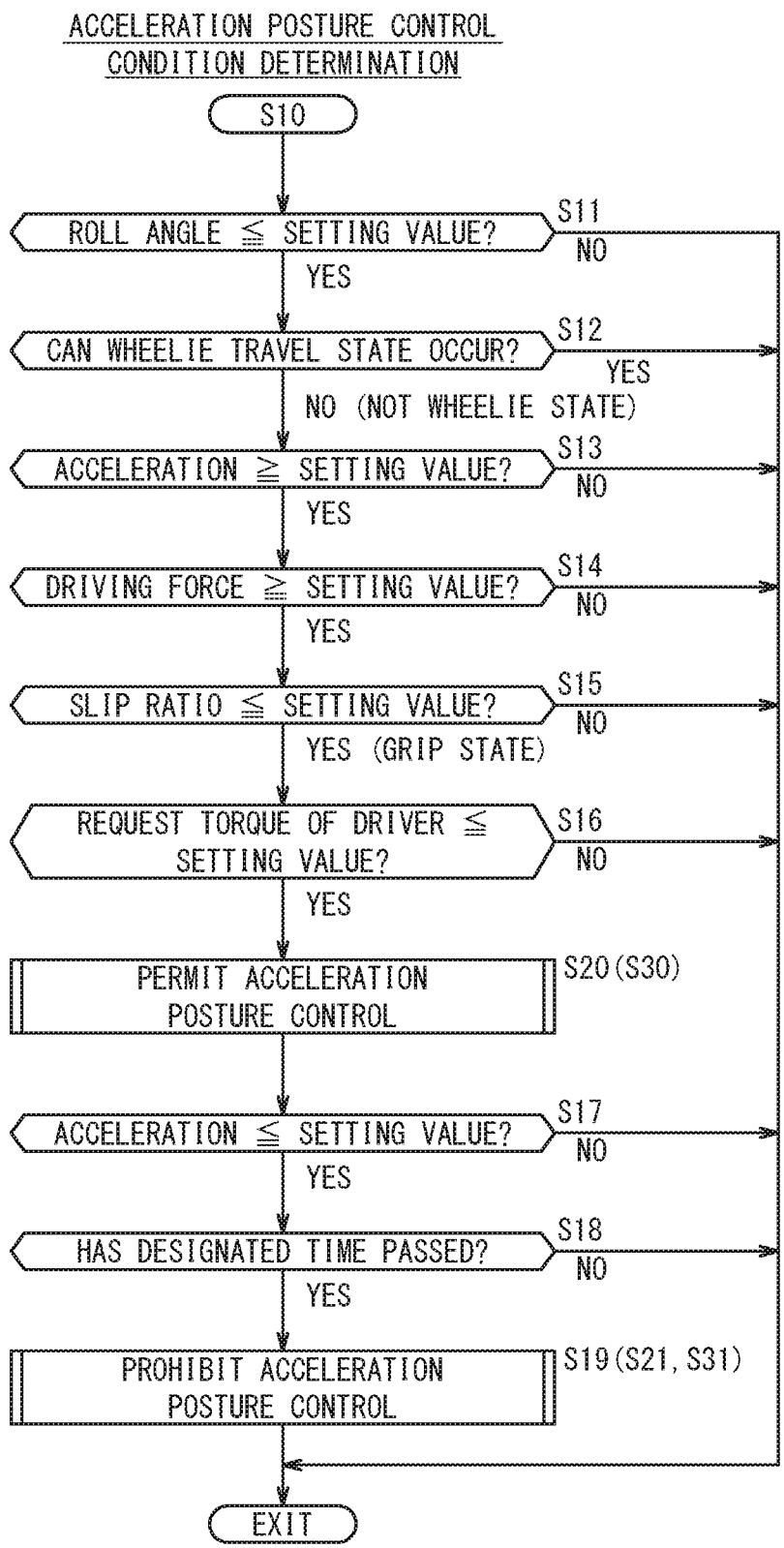
FIG. 5 is a flowchart expressing the detail of an acceleration posture control condition determination process in FIG. 4.
Figure 6:
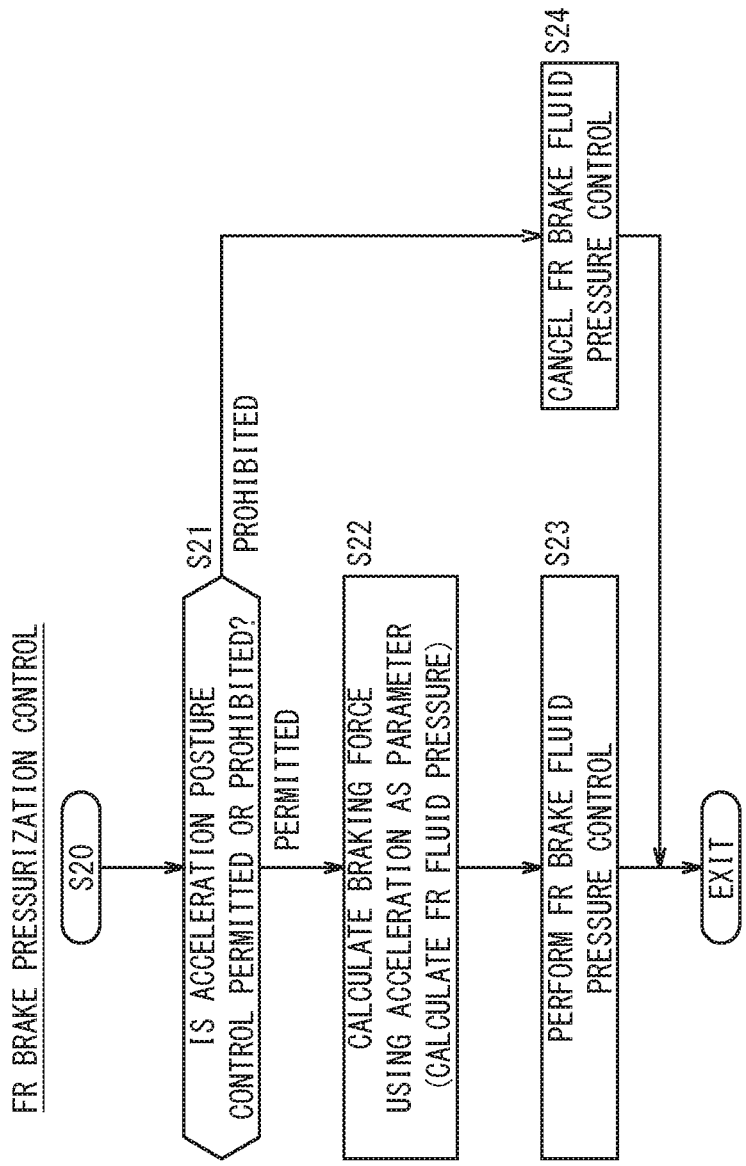
FIG. 6 is a flowchart expressing the detail of a front brake pressurization control process in FIG. 4.
Figure 7:
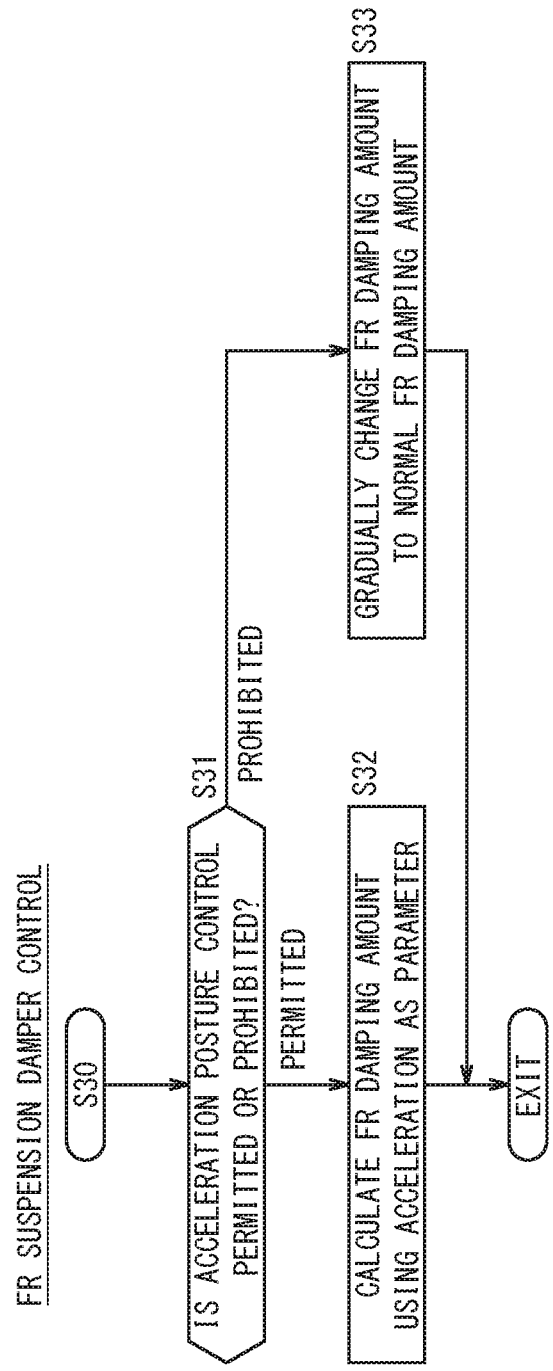
FIG. 7 is a flowchart expressing the detail of a front suspension damper control process in FIG. 4.

In the travel of the two-wheeled vehicle 10, an acceleration posture control condition determination process in FIG. 5 is repeatedly performed at predetermined time intervals in step S10. In step S20, a front brake pressurization control (FR brake pressurization control) process in FIG. 6 is performed. If necessary, for example, in accordance with the kind of the vehicle, a front suspension damper control (FR suspension damper control) process in FIG. 7 is performed in step S30.

FIG. 5 illustrates the detail of the acceleration posture control condition determination process in step S10.

In step S11, it is determined whether the roll angle θr detected by the roll angle sensor 128 is less than or equal to a setting value that is set in advance at which a wheelie can occur.

If the roll angle θr is less than or equal to the setting value (step S11: YES), in step S12, the front wheel rise detection unit 63a determines whether the wheelie travel state can occur (wheelie determination) at a position where the motorcycle 10 rises from a corner (curve), for example.

Figure 8:
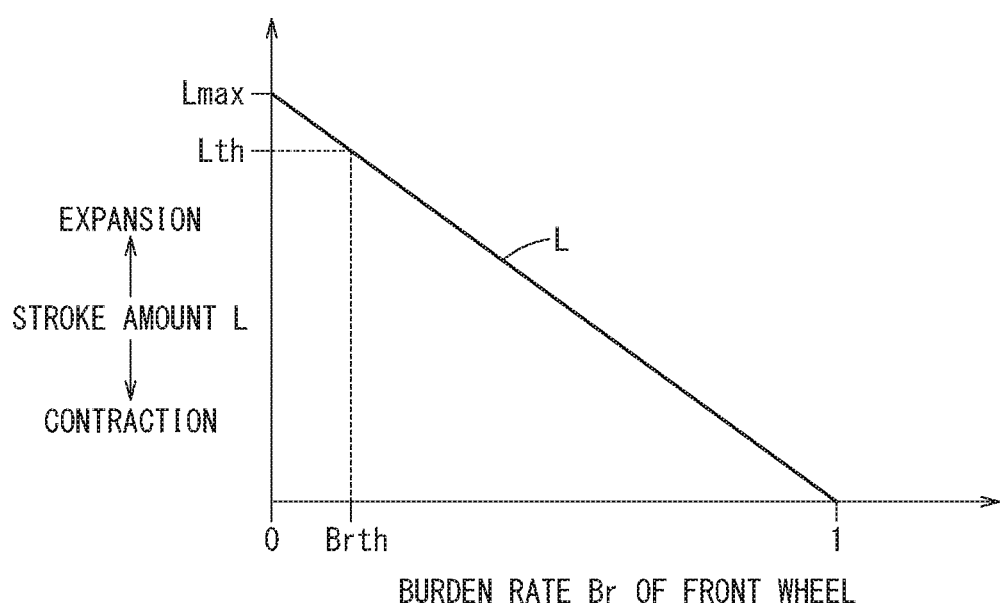
FIG. 8 is a characteristic diagram that expresses the relation between a burden rate of a front wheel and a stroke amount of a front fork.

FIG. 8 is a characteristic diagram (map) that expresses the relation between a burden rate Br of the front wheel FW (burden rate of front wheel) and the stroke amount L (expansion and contraction amount) of the front fork 32.

The burden rate Br of the front wheel is a ratio of a burden (load) applied to the front wheel FW to an entire burden (entire load) applied to the front wheel FW and the rear wheel RW. The total of the burden rate Br of the front wheel FW and a burden rate of the rear wheel RW is one. In the front wheel-burden rate map in FIG. 8, if the burden rate Br of the front wheel satisfies Br=0, it is the wheelie state (front wheel lifted state). Thus, the stroke amount L becomes a maximum value (a rise amount from a reference becomes the maximum) Lmax. On the other hand, if the burden rate Br of the front wheel FW satisfies Br=1, it is a rear wheel lifted state. Thus, the stroke amount L becomes the minimum (a sag amount from the reference becomes the maximum).

In the present embodiment, in order to detect whether the wheelie travel state can occur, it is assumed that the stroke amount L at a predetermined burden rate Brth before the burden rate Br of the front wheel FW becomes zero is regarded as a threshold Lth, and then, in step S12, it is determined whether the stroke amount L detected by the stroke sensor 132 becomes more than or equal to the threshold Lth (L≥Lth).

If the stroke amount L has become the threshold Lth (step S12: NO), it is determined that the current state is not the wheelie state but the state is likely to be changed to the wheelie travel state. Next, in step S13, it is determined whether the front-rear acceleration A detected by the acceleration sensor 134 is more than or equal to a predetermined setting value in which the wheelie state can occur.

If the front-rear acceleration A is more than or equal to the setting value (step S13: YES), in step S14, it is determined whether driving force of the rear wheel RW by the engine E (value that is obtained by multiplying engine torque by gear ratio) is more than or equal to a predetermined setting value in which the wheelie state can occur.

If the driving force is more than or equal to the setting value (step S14: YES), in step S15, the slip ratio is calculated on the basis of the front wheel speed sensor 61, the rear wheel speed sensor 62, and vehicle body speed, and it is determined whether the calculated slip ratio is less than or equal to a predetermined setting value expressing that the front wheel FW and the rear wheel RW grip a road surface.

If the slip ratio is less than or equal to the setting value (step S15: YES) (grip state), in step S16, it is determined whether request torque of a driver is less than or equal to a predetermined setting value in which the wheelie state is not desired on the basis of a detected value of the grip opening θg from the throttle grip opening sensor 122.

If the request torque of the driver is less than or equal to the setting value (step S16: YES), the front brake pressurization control in step S20 is permitted in order to prevent an occurrence of the wheelie state.

FIG. 6 illustrates the detail of the front brake pressurization control process.

In step S21, if the acceleration posture control is permitted (step S21: YES), in step S22, braking force using the front-rear acceleration A as a parameter, that is, close duty of the brake caliper 53b of the front wheel brake 53 is calculated.

In this case, in step S23, the ECU 63 controls the ABS modulator 64 so as to perform opening/closing control for the brake caliper 53b of the front wheel brake 53 (perform fluid pressure control for front brake) in accordance with the calculated close duty from the ABS modulator 64 through the fluid path 153. Thus, since the braking force is applied to the front wheel FW through the brake disc 53a, the front fork 32 can be operated in the direction in which the front fork 32 sags (direction in which front suspension shrinks) in accordance with deceleration of the vehicle 10 and acceleration behavior by the driving force of the rear wheel RW. Therefore, the occurrence of vehicle body pitch, that is, the wheelie state can be prevented.

As a result, the posture of the two-wheeled vehicle 10 is controlled so that the wheelie is less likely to occur, and acceleration loss can be reduced compared to a conventional case in which control is performed after the wheelie occurs (engine torque is controlled so as to be reduced by TBW (throttle by wire) technique or the like).

Next, the process returns to step S17 in the flowchart in FIG. 5, and it is determined whether the front-rear acceleration A is less than or equal to a predetermined setting value in which the wheelie state does not occur. If the front-rear acceleration A is less than or equal to the setting value (step S17: YES), a designation timer (not shown) is started, and if the time for which the front-rear acceleration A is less than or equal to the setting value has become a time designated by the designation timer in step S18 (step S18: YES), it is determined that the wheelie state does not occur. Thus, the acceleration posture control is prohibited in step S19.

Therefore, the acceleration posture control is prohibited in step S21 in FIG. 6, and the control of FR brake fluid pressure in the front wheel brake 53 from the ECU 63 through the ABS modulator 64 is canceled in step S24.

Note that if the acceleration posture control in step S20 is permitted, in addition to the front pressurization control in steps S21 to S24, front suspension damper control in step S30 in the flowchart in FIG. 7 may be simultaneously performed, if necessary.

That is to say, if the acceleration posture control regarding the front suspension damper control is permitted in step S31 (step S31: YES), in step S32, the damping amount (FR damping amount) of a front suspension damper using the front-rear acceleration A as a parameter is calculated and the front suspension damper is controlled through the ECU 63.

In this case, the front suspension damper that is housed in the front fork 32 is electronically controlled and the damping amount of the front suspension damper is controlled by a predetermined amount stepwise from the normal damping amount on the basis of the calculated damping amount so that the front suspension is weakened. Thus, the front fork 32 sags in accordance with the predetermined amount, so that the occurrence of the wheelie state is suppressed.

In this case, the process returns to step S17 in the flowchart in FIG. 5, and it is determined whether the front-rear acceleration A is less than or equal to the predetermined setting value in which the wheelie state does not occur. If the front-rear acceleration A is less than or equal to the setting value, the designation timer (not shown) is started, and if the time for which the front-rear acceleration A is less than or equal to the setting value has become the time designated by the designation timer in step S18, it is determined that the wheelie state does not occur. Thus, the acceleration posture control is prohibited in step S31.

As illustrated in FIG. 7, if the acceleration posture control is prohibited in step S31, the FR damping amount is changed from the FR damping mount regarding the acceleration posture control to the normal FR damping amount gradually in step S33.

In this manner, the process ends. Note that if step S11: NO, step S12: YES, steps S13 to S16: NO, or steps S17, S18: NO, the process returns to step S10.

Figure 9:
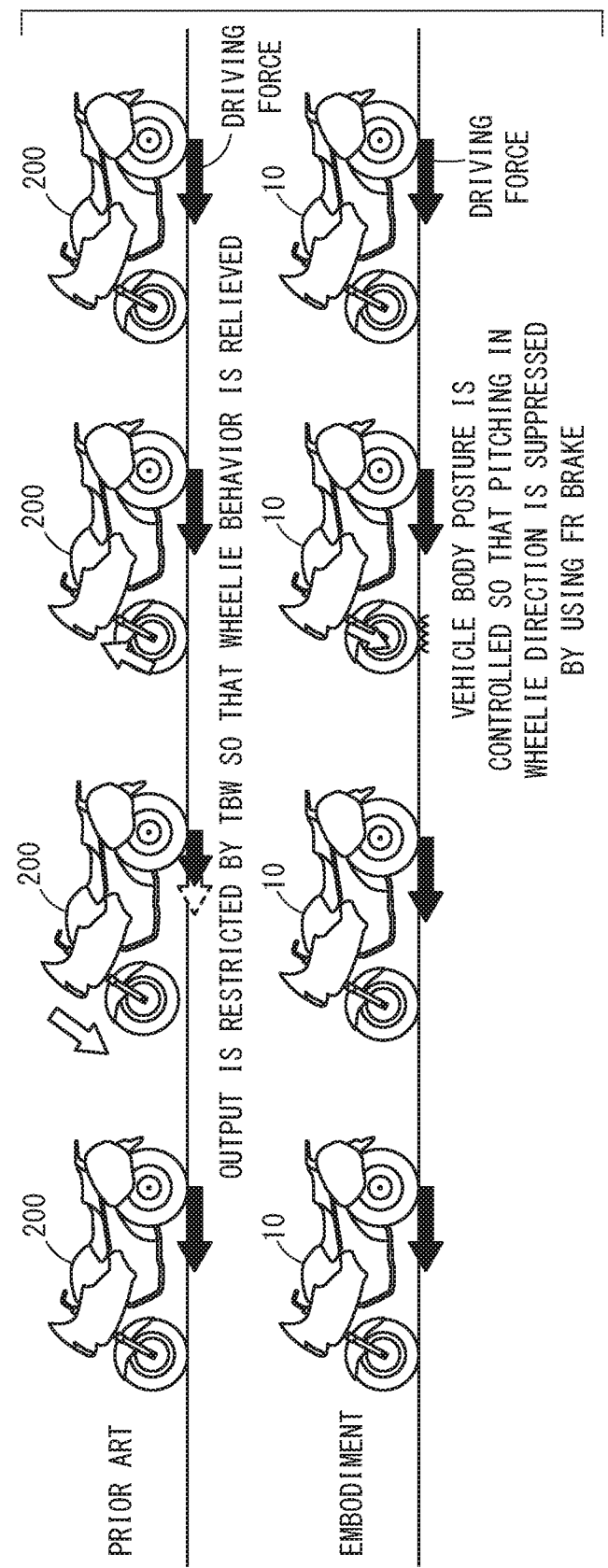
FIG. 9 is an explanatory diagram that compares the prior art and the embodiment.

FIG. 9 is an explanatory diagram that compares the prior art (upper side) and the present embodiment (lower side).

In a motorcycle 200 according to the prior art, if the wheelie state in which the front wheel is lifted due to the large driving force of the rear wheel has been detected, wheelie behavior is relieved by restricting engine output by the TBW technique or the like. Thus, the state is returned to the normal travel state.

On the other hand, in the motorcycle 10 according to the embodiment, if it is detected that the wheelie state is likely to occur due to the large driving force of the rear wheel RW, the vehicle body posture is controlled so that the pitching in a wheelie direction is suppressed by using the FR brake (front suspension damper control may be also used). Thus, the occurrence of the wheelie state can be prevented, and both the easiness of the driver's operation and the reduction of the acceleration loss can be achieved.

[The Invention that can be Obtained from the Embodiment]

Here, the invention that can be obtained from the above embodiment is described. Note that the reference symbol used in the above embodiment is added to a structure component with parentheses to help understanding; however, the structure component is not limited thereto.

The motorcycle (10) according to the present invention includes: the front wheel brake (53) configured to brake the front wheel (FW) that is supported by the front fork (32) including the suspension; the rear wheel brake (57) configured to brake the rear wheel (RW) supported by the swing arm (36); the ABS modulator (64) connected to the front wheel brake (53) and the rear wheel brake (57); the control unit (63) configured to control the ABS modulator (64) on the basis of the front wheel speed and the rear wheel speed; and the front wheel rise detection unit (63a, 132, step S12) configured to detect whether the front wheel (FW) is likely to rise from the road surface, wherein when the front wheel rise detection unit (63a, 132, step S12) detects that the front wheel (FW) is likely to rise, the control unit (63) operates the front wheel brake (53) through the ABS modulator (64).

In this structure, if it has been detected that the front wheel (FW) of the motorcycle (10) is likely to rise from the road surface (wheelie travel is likely to occur), the front wheel brake (53) is operated through the ABS modulator (64). Thus, the suspension operates in the direction in which the front fork (32) sags. Therefore, it is possible to prevent the wheelie travel state of the motorcycle (10) from occurring with the simple structure.

In addition, in the motorcycle (10), the front wheel rise detection unit (63a, 132, step S12) may be the stroke sensor (132) provided to the front fork (32) and configured to detect the expansion and contraction amount of the front fork (32).

The stroke sensor (132) can detect the expansion and contraction amount of the front fork (32) easily and precisely.

Moreover, in the motorcycle (10), when the expansion and contraction amount becomes more than or equal to the threshold (Lth), the front wheel rise detection unit (63a, 132, step S12) may detect that the front wheel (FW) is likely to rise.

In this structure, when the expansion amount is more than or equal to the predetermined threshold (Lth), it is detected that the front wheel (FW) is likely to rise. Thus, it is possible to precisely detect that the front wheel (FW) is likely to rise.

Furthermore, in the motorcycle (10), when the front wheel rise detection unit (63a, 132, step S12) detects that the front wheel (FW) is likely to rise, the control unit (63) may calculate the damping amount of the front suspension damper using the acceleration (A) as the parameter.

In this structure, the damping amount of the front suspension damper is controlled in accordance with the acceleration (A) when the motorcycle (10) is accelerated, so that the front suspension damper can be contracted. Thus, it is possible to further prevent the wheelie travel state from occurring.

The present invention is not limited to the above embodiment and may employ various structures on the basis of the description in the present specification.

What is claimed is:

1. A motorcycle comprising:
    a front wheel brake configured to brake a front wheel that is supported by a front fork including a suspension;
    a rear wheel brake configured to brake a rear wheel supported by a swing arm;
    an ABS modulator connected to the front wheel brake and the rear wheel brake;
    a control unit configured to control the ABS modulator on a basis of front wheel speed and rear wheel speed; and
    a front wheel rise detection unit configured to detect whether the front wheel is likely to rise from a road surface, wherein
    when the front wheel rise detection unit detects that the front wheel is likely to rise, the control unit operates the front wheel brake through the ABS modulator.

2. The motorcycle according to claim 1, wherein the front wheel rise detection unit is a stroke sensor provided to the front fork and configured to detect an expansion and contraction amount of the front fork.

3. The motorcycle according to claim 2, wherein when the expansion and contraction amount becomes more than or equal to a threshold, the front wheel rise detection unit detects that the front wheel is likely to rise.

4. The motorcycle according to claim 1, wherein when the front wheel rise detection unit detects that the front wheel is likely to rise, the control unit calculates a damping amount of a front suspension damper using acceleration as a parameter.

5. The motorcycle according to claim 4, wherein the control unit calculates the damping amount so that the front fork sags.

* * * * *